(12) United States Patent
Choiniere et al.

(10) Patent No.: US 8,712,201 B2
(45) Date of Patent: Apr. 29, 2014

(54) BULLET LENS DESIGN FOR THE DASAL SEEKER

(75) Inventors: Michael J. Choiniere, Merrimack, NH (US); Chris M. Bower, Nashua, NH (US); James R. Lynch, III, Amherst, NH (US); Carl Alan Way, Nashua, NH (US); Marcus Hatch, Waltham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 131 days.

(21) Appl. No.: 13/376,850

(22) PCT Filed: Apr. 8, 2011

(86) PCT No.: PCT/US2011/031698
§ 371 (c)(1),
(2), (4) Date: Dec. 8, 2011

(87) PCT Pub. No.: WO2011/127355
PCT Pub. Date: Oct. 13, 2011

(65) Prior Publication Data
US 2012/0082423 A1 Apr. 5, 2012

Related U.S. Application Data

(60) Provisional application No. 61/321,893, filed on Apr. 8, 2010.

(51) Int. Cl.
*G02B 6/04* (2006.01)

(52) U.S. Cl.
USPC .......................................... 385/116; 385/120

(58) Field of Classification Search
USPC .................................................. 385/116, 120
See application file for complete search history.

(56) References Cited

U.S. PATENT DOCUMENTS

| | | | | |
|---|---|---|---|---|
| 5,459,605 | A | * | 10/1995 | Kempf ......................... 359/462 |
| 5,582,476 | A | * | 12/1996 | Hansen ......................... 362/115 |
| 6,222,970 | B1 | * | 4/2001 | Wach et al. ................... 385/115 |
| 2006/0045444 | A1 | | 3/2006 | Miller et al. |

FOREIGN PATENT DOCUMENTS

| | | |
|---|---|---|
| JP | 61018904 | 1/1986 |
| JP | 63168058 | 7/1988 |
| JP | 2007132792 | 5/2007 |

* cited by examiner

*Primary Examiner* — Jerry Rahll
(74) *Attorney, Agent, or Firm* — Maine Cernota & Rardin; Andrew P. Cernota; Daniel J. Long

(57) ABSTRACT

An optic assembly is provided, that assembly comprising: a bullet collection lens; a plurality of fiber optic fiber bundles; and those fiber optic bundles being parallel to a central channel.

11 Claims, 5 Drawing Sheets

BULLET LENS DESIGN FOR THE DASAL SEEKER

RELATED APPLICATIONS

This application claims the benefit of U.S. Provisional Application No. 61/321893, filed Apr. 8, 2010. This application is herein incorporated by reference in their entirety for all purposes.

FIELD OF THE INVENTION

The invention relates to apparatus and methods for uniform angle resolution over the entire FOV.

BACKGROUND OF THE INVENTION

The known collection optic assembly illustrated in FIGS. 1 and 2, consists of a barrel spherical collection lens 9 and seven bundles of fiber optic strands 11, each bundle 11 dedicated to a specific photon sensing detector (not shown). Each fiber bundle 11 contains over 1000 fiber optic strands. One fiber optic bundle 13 is located in the center of the six surrounding bundles 15. All seven fiber optic bundles 11 are pre-cast and end polished to precision diameters prior to assembly. This center bundle 13 is aligned to the system boresight axis. In the such a configuration, these six surrounding bundles are spaced at 60° with respect to each other and inclined at 14° with respect to the center bundle. They are also sized and positions to be in tangential contact to the center bundle and to each other. These bundles are epoxied into a ferrule (not shown) having precision sized gap and precision angled holes. Precision ferrules, fixtures and skilled technicians are required to properly fabricate and assemble the collection optic assembly. As illustrated in FIG. 2, significant space is left in the ferrule between the bundles 13,15 to allow for the correct orientation with respect to the barrel lens 9. In this previous configuration, it was necessary to maintain a precision air gap 17 between the polished ends of the seven fiber bundle to the rear surface of the collection lens within +/−0.001 inches or less.

The previous design yielded poor gain curve performance in the center of the field of view (FOV), thereby resulting in poor angle resolution. This was a key system performance parameter of seekers since most weapon systems typically track in the center of the FOV at the termination range.

Expensive component costs and fixture costs. Difficult assembly requiring skilled technicians. High number of assembly process steps.

What is needed, therefore, are techniques to optimize the seeker gain curves to generate a uniform angle performance over the 14 degree linear field of view (FOV).

SUMMARY OF THE INVENTION

One embodiment of the present invention provides an optic assembly, the assembly comprising, a bullet collection lens, a plurality of fiber optic fiber bundles, and the fiber optic bundles being parallel to a central channel and abutting a flat side of the bullet collection lens.

Another embodiment of the present invention provides such an optic assembly further comprising thin wall shrink sleeving disposed around each fiber optic bundles in the plurality of fiber optic bundles.

A further embodiment of the present invention provides such an optic assembly further comprising a collar disposed around the plurality of fiber optic bundles.

Yet another embodiment of the present invention provides such an optical assembly wherein the collar is disposed proximate to an end of the plurality of fiber optic bundles, and the end of the plurality is polished and flush with the collar.

A yet further embodiment of the present invention provides such an optical assembly wherein the bullet lens is configured to optimize a spot size being ported to fibers within the plurality of fiber optic fiber bundles.

Still another embodiment of the present invention provides such an optical assembly wherein each fiber optic bundle comprises a plurality of fiber optic fibers surrounded by a conformable sleeve.

A still further embodiment of the present invention provides such an optical assembly wherein the plurality of fiber optic bundle comprises seven fiber optic bundles.

One embodiment of the present invention provides a method for the manufacturing of an optical assembly; the method comprising: assembling a plurality of fiber optic bundles within a collar; aligning ends of bundles within the plurality of fiber optic bundles with each other such that the ends of bundles are substantially coplanar; polishing the ends of bundles flush to the collar; applying the ends to a flat surface of a bullet collection lens.

Another embodiment of the present invention provides such a method further comprising inspecting the plurality of fiber optic bundles after the assembling a plurality of fiber optic bundles.

A further embodiment of the present invention provides such a method, the method further comprising inspecting aligned ends of the bundles.

Yet another embodiment of the present invention provides such a method, the method further comprising inspecting the ends once polished flush with the collar.

A yet further embodiment of the present invention provides such a method further comprising inspecting the optical assembly once completed.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
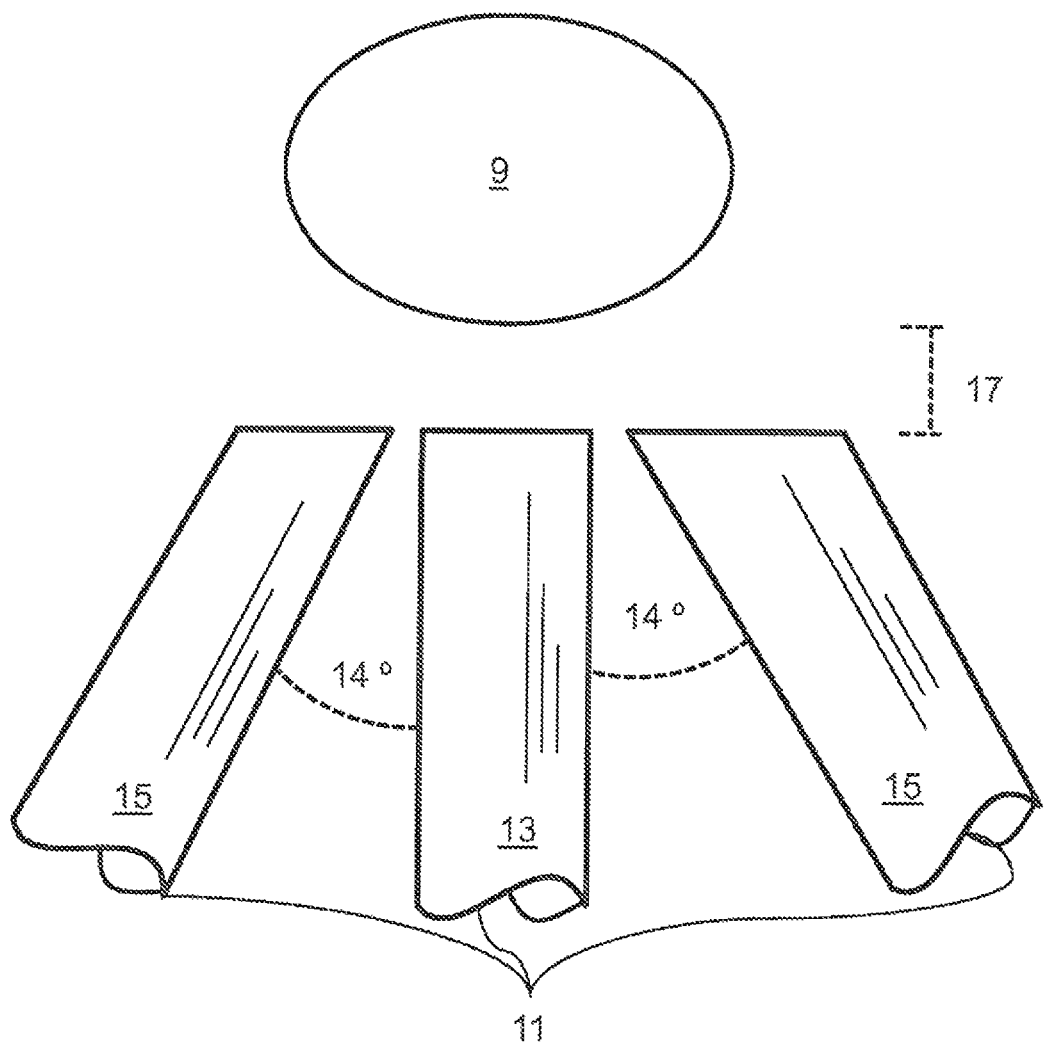
FIG. 1 is a diagram illustrating a prior art optic assembly.
Figure 2:
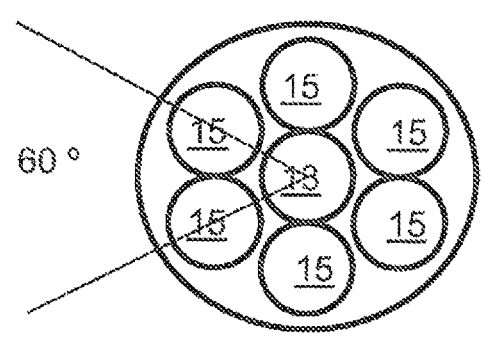
FIG. 2 is a diagram illustrating a plan view of a prior art optic assembly.
Figure 3:
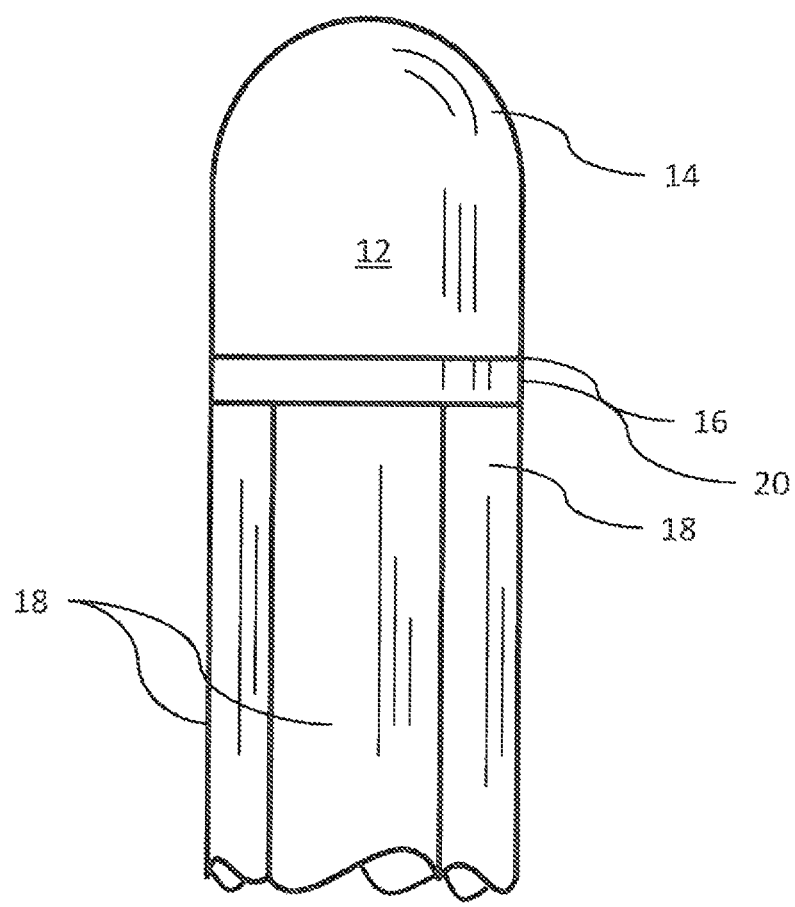
FIG. 3 is a elevation view illustrating an optic assembly configured in accordance with one embodiment of the present invention.
Figure 4:
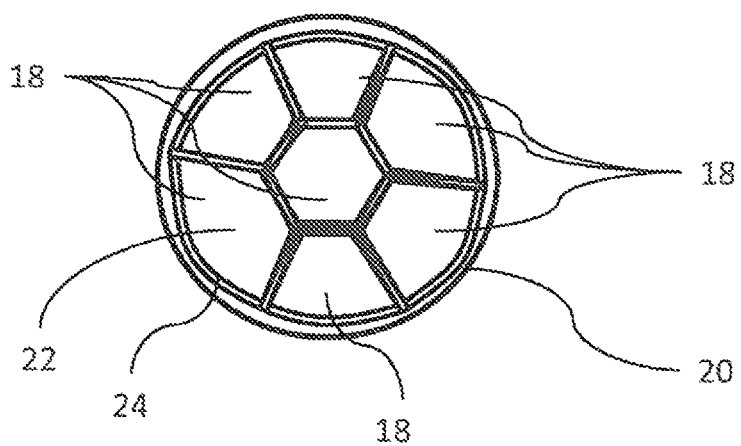
FIG. 4 is a plan view illustrating a cross section of an optic assembly configured in accordance with one embodiment of the present invention.

One embodiment of the present invention, illustrated in FIG. 3 provides a bullet collection lens 12 having a curved end 14 and a flat end 16. A plurality of fiber optic bundles 18 are collected into a collar 20. Bundles 18 are formed by many optical fibers 22 surrounded by a conformable sheath or sleeving 24. The collar 20 compresses the bundles 18 together, deforming the rounded bundles 18 into a "flower" shaped cross section illustrated in FIG. 4. The fiber bundles 18, are aligned such that they have a flat end. The end of the now assembled plurality of fiber bundles is polished flush to the collar 20 allowing for a smooth joint to the flat surface of the bullet collection lens 12. The fiber optical bundles 18 are abutted to the flat surface 16 of the bullet lens at their polished end flush with the collar 20. The bundles 18 may be secured to the collar 20 and to the ends of the fiber bundles 18. The bundles 18 are thus in contact with the lens 12 in a way that is substantially free of gaps.

The previous design rejected energy in the surrounding bundles (the energy exceeded the NA limits of the fibers), resulting in flat gain curves at the center of the FOV. In contrast to the previous design, bullet lens, by collecting all the energy, provides a uniform transform between amplitude and angle space, thus excellent angle response over the FOV of the seeker.

By altering the lens design from the spherical lens to the bullet lens, and by making the surrounding bundles parallel to the center channel, the numerical aperture (NA) of the fibers are now matched with the bullet lens performance.

Figure 5:
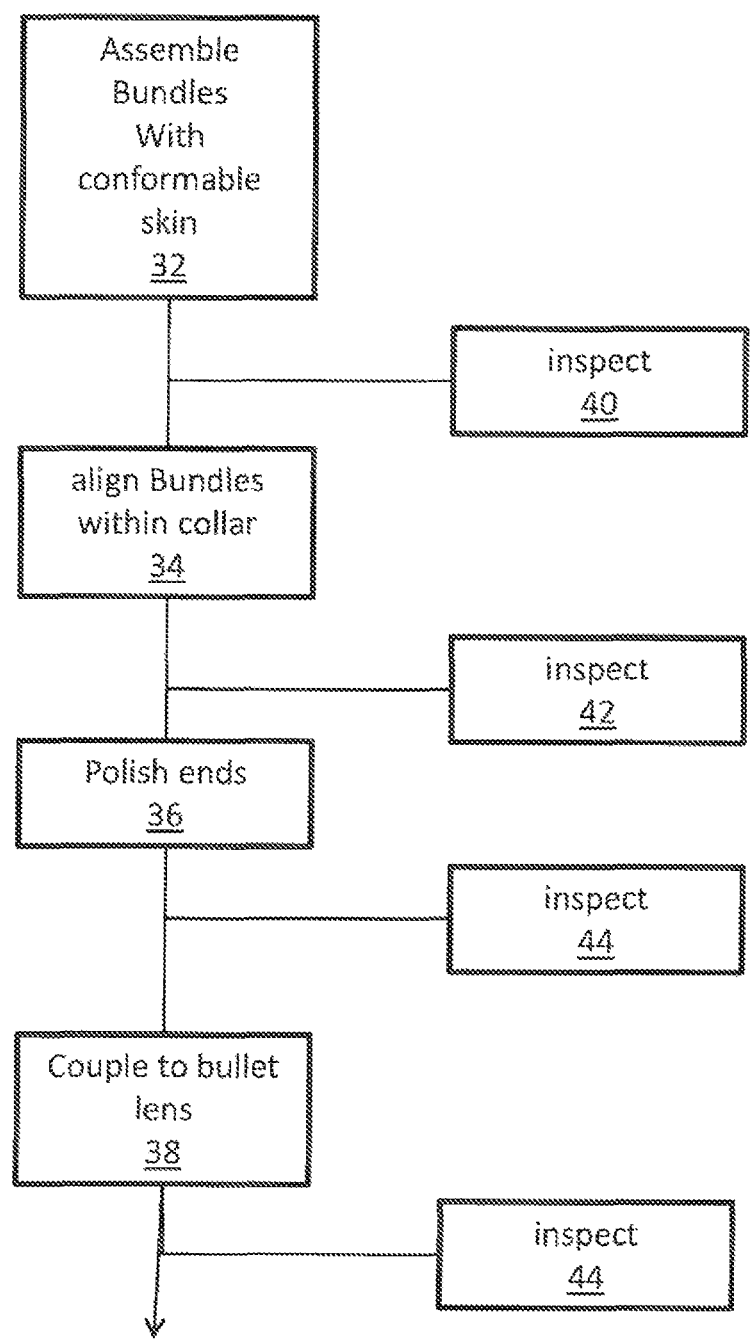
FIG. 5 is a flowchart of a method for manufacturing an optical assembly configured according to one embodiment of the present invention.

As illustrated in FIG. 5, the system is produced by a method comprising several steps. The optical fiber bundles are assembled with a conformable sleeve 32. The bundles thus formed are aligned within the collar such that the end of the bundle is flush with the surface of the collar 34. The ends are polished 36 and the polished ends of the assembly are coupled to the bullet lens 38. After each step in the process, inspection 40, 42, 44 may occur allowing for improved quality control.

An additional benefit of the bullet lens design was: it simplified the fabrication of the fiber bundles and the assembly of the system. The fiber bundles are constructed as a grouping rather as separate bundles, reducing the fabrication time. The assembly process of the fiber bundles to the lens requires multiple fabrication steps to set the lens spacing and the orientation of the fibers to the lens. The bullet lens design simple allows the fibers to be ganged together and butted to the base of the bullet lens.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An optic assembly, said assembly comprising:
   a bullet collection lens;
   a plurality of fiber optic fiber bundles; each fiber optic bundle in said plurality of fiber optic bundles comprising optic fibers within a thin wallet shrink sleeve;
   a collar disposed around said plurality of fiber optic bundles, said bundles being compressed by said collar such that said plurality of fiber optic bundles has a round cross section and said fiber optic bundles being parallel to a central channel and abutting a flat side of said bullet collection lens; and
   said collar is disposed proximate to an end of said plurality of fiber optic bundles, and said end of said plurality is polished and flushed with said collar.

2. The optic assembly of claim 1, wherein each said fiber optic bundle comprises a plurality of fiber optic fibers surrounded by a conformable sleeve.

3. The optic assembly of claim 1 wherein said plurality of fiber optic bundle comprises seven fiber optic bundles.

4. A method for the manufacturing of an optical assembly; said method comprising:
   assembling a plurality of fiber optic bundles within a collar;
   aligning ends of bundles within said plurality of fiber optic bundles with each other such that said ends of bundles are substantially coplanar;
   polishing said ends of bundles flush to said collar; applying said ends to a flat surface of a bullet collection lens.

5. The method of claim 4, said method further comprising inspecting said plurality of fiber optic bundles after said assembling a plurality of fiber optic bundles.

6. The method of claim 4, said method further comprising inspecting aligned ends of said bundles.

7. The method of claim 4, said method further comprising inspecting said ends once polished flush with said collar.

8. The method of claim 4 further comprising inspecting said optical assembly once completed.

9. An optic assembly, said assembly comprising:
   a bullet collection lens;
   a plurality of fiber optic fiber bundles, each fiber optic bundle in said plurality of fiber optic bundles comprising optic fibers within a thin walled shrink sleeve;
   a collar disposed around said plurality of fiber optic bundles, said bundles being compressed by said collar such that said plurality of fiber optic bundles has a round cross section and
   said collar optic bundles being parallel to a central channel and abutting a flat side of said bullet collection lens; and
   said bullet collection lens is configured to optimize a spot size being ported to fibers within said plurality of fiber optic fiber bundles.

10. The optical assembly of claim 9, wherein each said fiber optic bundle comprises a plurality of fiber optic fibers surrounded by a conformable sleeve.

11. The optic assembly of claim 9, wherein said plurality of fiber optic bundle comprises seven fiber optic bundles.

* * * * *